United States Patent Office 3,365,289
Patented Jan. 23, 1968

3,365,289
N - [1- or 2 - (4,5,6,7,8,9 - HEXAHYDRO - 4,7 - METHANOINDANYL)] - N',N' - DIMETHYL UREA AND USE IN WEED CONTROL
Paul Raff and Ludwig Schuster, Ludwigshafen (Rhine), Adolf Fischer, Mutterstadt, Pfalz, Guenther Scheuerer, Ludwigshafen (Rhine), and Gustav Steinbrunn, Schwegenheim, Pfalz, Germany, assignors to Badische Anilin- & Soda-Fabrik Aktiengesellschaft, Ludwigshafen, (Rhine), Germany
No Drawing. Filed Jan. 19, 1965, Ser. No. 426,664
Claims priority, application Germany, Jan. 24, 1964, B 75,134
2 Claims. (Cl. 71—120)

ABSTRACT OF THE DISCLOSURE

Herbicide compounds which are N-[1- or 2-(4,5,6,7,8,9-hexahydro-4,7-methanoindanyl)]-N'-dimethyl ureas of the formula below and uses thereof in weed control.

The present invention relates to urea derivatives, and more particularly to urea derivatives having selective herbicidal action. These urea derivatives are suitable for controlling weeds without damaging corps.

We have found that compounds having the formula

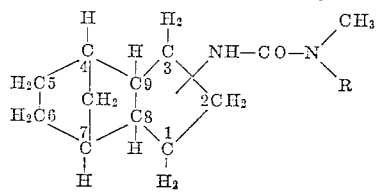

in which R denotes a methyl group having a good herbicidal action. It is immaterial for the herbicidal action whether the tricyclic hydrocarbon radical bears substituents in 1- (or 3-) or 2-position. Since the arrangement of the various individuals to the various formulae of the isomers has not yet been clarified, the following urea derivatives are characterized by their physical constants and listed as active substances:

N-[1- or 2-(4,5,6,7,8,9 - hexahydro - 4,7 - methanoindanyl)]-N'-dimethylurea; melting point 154° to 156° C.

N-[2- or 1-(4,5,6,7,8,9 - hexahydro - 4,7 - methanoindanyl)]-N'-dimethylurea; melting point 202° to 203° C.

The ureas may be prepared analogously to known methods by reaction of appropriate isocyanates with the appropriate amines in inert or aqueous solvents, or from the amines with the appropriate carbamic acid derivatives dissolved in a hydrocarbon and in the presence of an acid-binding agent or a catalyst.

Appropriate amines are obtained as mixtures of isomers by reacting 4,5,6,7,8,9-hexahydro-4,7-methanoindene with hydrocyanic acid in the presence of sulfuric acid and subsequent hydrolysis of the resultant formamide. The following equations illustrate the possibilities of preparation:

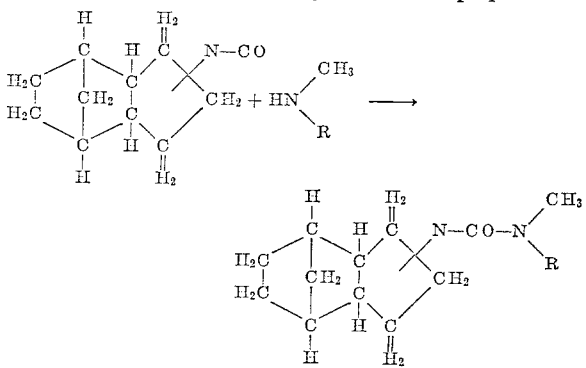

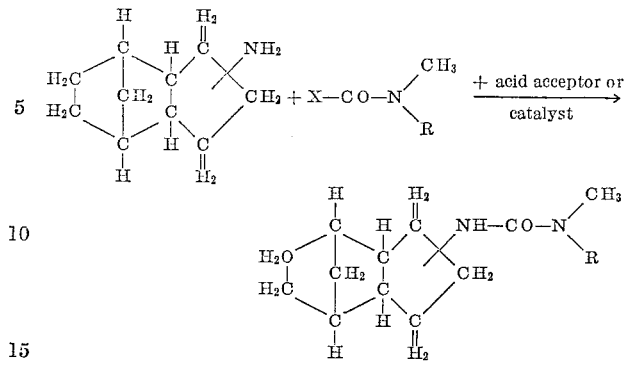

in which R has the meanings given above and X denotes halogen, alkoxy or phenoxy.

The compounds may be used alone or mixed with other herbicidal active substances, as for example urea derivatives, triazines, pyridazone derivatives, carbamates, thiocarbamates, uracil derivatives or borates. The rate of application is from about 1 to 10 kg. of active substance per hectare.

The agents according to this invention may be prepared by mixing the urea derivatives with conventional solid or liquid carrier substances, for example fertilizers, inert solid carrier substances, talc, diatomaceous earth, water, organic liquids, xylene, petroleum distillates or synthetic organic liquids.

The following examples illustrate the use of the agents according to this invention.

EXAMPLE 1

Barley (*Hordeum vulgare*), beet (*Beta vulgaris*), cotton (Gossypium spp.), rice (*Oryza sativa*), wild oats (*Avena fatua*), slender foxtail (*Alopecurus myosuroides*), annual meadow grass (*Poa annua*), white mustard (*Sinapis alba*) and a mixture of weeds consisting of chickweed (*Stellaria media*), small nettle (*Urtica urens*), common goosefoot (*Chenopodium album*), camomile (*Matricaria chamomilla*), stork's bill (*Geranium*), amaranth (*Amaranthus retroflexus*) and tares (*Vicia*) are sown in plastic pots having a diameter of 8 cm. in a greenhouse. Immediately thereafter 2.5 kg. of active substance (N-[1- or 2-(4,5,6,7,8,9 - hexahydro - 4,7 - methanoindanyl)] - N'-dimethylurea, melting point 154° to 156° C.) per hectare dispersed with sodium lignin sulfonate in an amount of water equivalent to 500 liters per hectare is sprayed onto the surface of the soil. The plants at first develop normally but about eight days later begin to wither from the leaf tips. Two to three weeks later, beet (*Beta vulgaris*), slender foxtail (*Alopecurus myosuroides*), wild oats (*Avena fatua*), annual meadow grass (*Poa annua*), white mustard (*Sinapis alba*) and the weed mixture have almost completely withered, whereas rice (*Oryza sativa*), barley (*Hordeum vulgare*) and cotton (Gossypium spp.) continue to grow without damage.

EXAMPLE 2

Barley (*Hordeum vulgare*), beet (*Beta vulgaris*), cotton (Gossypium spp.), rice (*Oryza sativa*), slender foxtail (*Alopecurus myosuroides*), wild oats (*Avena fatua*), annual meadow grass (*Poa annua*) and white mustard (*Sinapis alba*) are sprayed in the greenhouse, after they have reached a growth height of 4 to 15 cm., with N-[1- or 2-(4,5,6,7,8,9-hexahydro-4,7-methanoindanyl)]-N'-dimethylurea (melting point 202° to 203° C.) in an amount corresponding to a rate of application of 2 kg. of active substance per hectare dispersed with sodium lignin sulfonate in an amount of water equivalent to 500 liters per hectare.

Some days later, the plants begin to wither from the leaf tips and two or three weeks later the beet (*Beta vulgaris*) is severely damaged and rice (*Oryza sativa*) only slightly damaged. Slender foxtail (*Alopecurus myosuroides*), wild oats (*Avena fatua*), annual meadow grass (*Poa annua*) and white mustard (*Sinapis alba*) are almost wholly destroyed, whereas cotton (*Gossypium* spp.) and barley (*Hordeum vulgare*) continue to grow without damage.

We claim:
1. A compound of the formula:

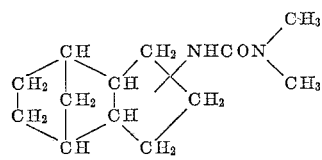

2. A process for suppressing unwanted plant growth which comprises applying to a group of plants including unwanted plant growth or to soil in which said group of plants will grow a herbicidal quantity of a compound of the formula:

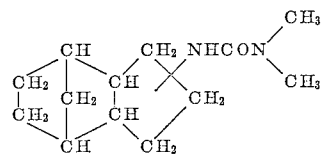

References Cited
UNITED STATES PATENTS
3,276,855  10/1966  Richter _____ 71—2.6

HENRY R. JILES, *Primary Examiner.*

UNITED STATES PATENT OFFICE
CERTIFICATE OF CORRECTION

Patent No. 3,365,289   January 23, 1968

Paul Raff et al.

It is certified that error appears in the above identified patent and that said Letters Patent are hereby corrected as shown below:

Column 2, the portion of the second formula reading 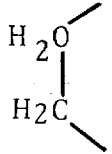 should read 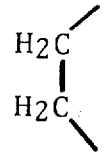

Signed and sealed this 25th day of November 1969.

(SEAL)
Attest:

Edward M. Fletcher, Jr.
Attesting Officer

WILLIAM E. SCHUYLER, JR.
Commissioner of Patents